(12) United States Patent
Rohilla et al.

(10) Patent No.: US 9,719,270 B2
(45) Date of Patent: Aug. 1, 2017

(54) CAR PARKING ASSEMBLY

(71) Applicant: HCL Technologies Limited, Uttar Pradesh (IN)

(72) Inventors: Shailendra Kumar Rohilla, Noida (IN); Shivani Tomar, Noida (IN); Navin Saini, Noida (IN)

(73) Assignee: HCL Technologies Limited, Uttar Pradesh (IN)

( * ) Notice: Subject to any disclaimer, the term of this patent is extended or adjusted under 35 U.S.C. 154(b) by 0 days.

(21) Appl. No.: 15/178,668

(22) Filed: Jun. 10, 2016

(65) Prior Publication Data
US 2017/0001799 A1    Jan. 5, 2017

(30) Foreign Application Priority Data

Jul. 2, 2015 (IN) ............................ 2008/DEL/2015

(51) Int. Cl.
*E04H 6/30* (2006.01)
(52) U.S. Cl.
CPC ....... *E04H 6/30* (2013.01); *B65G 2201/0294* (2013.01)
(58) Field of Classification Search
CPC .... E04H 6/08; E04H 6/12; E04H 6/14; E04H 6/22; E04H 6/30; E04H 6/34; B65G 2201/0294
See application file for complete search history.

(56) References Cited

U.S. PATENT DOCUMENTS

| | | | | |
|---|---|---|---|---|
| 1,851,262 | A * | 3/1932 | Riblet | E04H 6/30 414/241 |
| 1,998,290 | A * | 4/1935 | Schraeder, Jr. | E04H 6/30 414/245 |
| 3,467,310 | A * | 9/1969 | Fraser | E01B 25/22 238/4 |
| 3,750,899 | A * | 8/1973 | Greer | B66F 7/04 187/213 |
| 3,868,027 | A | 2/1975 | Matsura | |
| 5,330,305 | A * | 7/1994 | Go | E04H 6/186 191/1 R |
| 8,613,582 | B2 * | 12/2013 | Shani | E04H 6/245 414/232 |
| 2004/0067124 | A1 * | 4/2004 | Lee | E04H 6/186 414/234 |

(Continued)

FOREIGN PATENT DOCUMENTS

| | | |
|---|---|---|
| DE | 1959192 B2 | 7/1975 |
| EP | 0339136 B1 | 6/1992 |

*Primary Examiner* — Ashley Romano
(74) *Attorney, Agent, or Firm* — Hayes Soloway PC (57) ABSTRACT

Disclosed is a car parking assembly (100). In one aspect, the car parking assembly (100) comprises a rail mechanism (104) and a plurality of V-bars (106) mounted on the rail mechanism (104) to facilitate the parking of a car and horizontal movement of a parked car respectively. The rail mechanism (104) further comprises a first rail (202), a second rail (204) and a plurality of equally spaced connection. The V-bars (106) further comprises a first bar (502) for facilitating parking of a rear wheel of the car and a second bar (506) for facilitating parking of a front wheel of the car and wherein one end of the first bar (502) and one end of the second bar (506) are connected such that to form a obtuse angle.

4 Claims, 7 Drawing Sheets

(56) References Cited

U.S. PATENT DOCUMENTS

2010/0034626 A1* 2/2010 Reiniger ............... E04H 6/183
　　　　　　　　　　　　　　　　　　　414/253
2014/0112745 A1* 4/2014 Longley ............... E04H 6/06
　　　　　　　　　　　　　　　　　　　414/228
2014/0219751 A1* 8/2014 Segal ............... B65G 1/04
　　　　　　　　　　　　　　　　　　　414/235

* cited by examiner

CAR PARKING ASSEMBLY

CROSS-REFERENCE TO RELATED APPLICATIONS AND PRIORITY

The present application claims benefit from Indian Complete Patent Application No. 2008/DEL/2015, filed on Jul. 2, 2015, the entirety of which is hereby incorporated by reference.

TECHNICAL FIELD

The present subject matter described herein, in general, relates to a parking assembly and more particularly a car parking assembly for reducing a gap between two parked cars.

BACKGROUND

Parking a car in today's world is a real challenge as living space is reducing and cars volumes are increasing. As per studies numbers of cars are increasing exponentially all over the world. This increased amount of cars emphasizes on the criticality of parking space availability.

Conventional methods to solve this problem are multi-level car parking assembly or garages. Among the major disadvantages of such conventional methods is the large storage volume needed per car and land for construction of the multi-level car parking assembly. Further, automated or manual multi-level car parking assembly includes many mechanically-complicated moving parts which greatly increase the initial capital investment and also require continuous or at least frequent maintenance. Furthermore, such conventional methods cannot be employed in an already constructed building.

Generally, a building consists of car park slots, where people entering the building park their cars. In such places typically use of car parking slots is inefficient due to careless parking, further resulting in huge gaps between two cars in turn wastage of space. Further, the conventional methods cannot be employed in these spaces, for example basement due to space constraint.

SUMMARY

Before the present car parking assembly(s) for reducing a gap between two parked cars, are described, it is to be understood that this application is not limited to the particular assembly described, as there can be multiple possible embodiments which are not expressly illustrated in the present disclosures. It is also to be understood that the terminology used in the description is for the purpose of describing the particular implementations or versions or embodiments only, and is not intended to limit the scope of the present application. This summary is provided to introduce aspects related to car parking assembly for reducing a gap between two parked cars. This summary is not intended to identify essential features of the claimed subject matter nor is it intended for use in determining or limiting the scope of the claimed subject matter.

In one implementation, a car parking assembly for reducing a gap between two parked cars. The car parking assembly comprising a rail mechanism to facilitate horizontal movement of a car when parked. The rail mechanism comprising a first rail and a second rail arranged parallel to each other. The rail mechanism further comprising, a plurality of equally spaced connection bars where each connection bar is connected at one end to the first rail and at other end to the second rail and each of the connection bar is perpendicular to the first rail and the second rail. The car parking assembly further comprising a plurality of V-bars mounted on the rail mechanism to facilitate the parking of a car. The car is parked on two of the plurality of V-bars. Each of the V-bar comprising a first bar for facilitating parking of a rear wheel of the car, wherein the first bar comprises a ribbed pattern for restricting the movement of the rear wheel of the car, wherein the ribbed pattern partially covers the top surface of the first bar. Each of the V-bar further comprising a second bar for facilitating parking of a front wheel of the car. the second bar comprising a locking mechanism coupled with one end of second bar, and wherein the locking mechanism is configured to restrict movement of the front wheel of the car and wherein upon unlocking the locking mechanism the car is adapted to move forward. The second bar further comprising a pair of rollers displaced on the bottom surface of the second bar, wherein the pair of rollers are adapted to move over the first rail and the second rail. The one end of the first bar and one end of the second bar are connected such that to form an obtuse angle.

BRIEF DESCRIPTION OF THE DRAWINGS

The foregoing detailed description of embodiments is better understood when read in conjunction with the appended drawings. For the purpose of illustrating of the present subject matter, an example of construction of the present subject matter is provided as figures; however, the invention is not limited to the specific method and assembly disclosed in the document and the figures.

The present subject matter is described detail with reference to the accompanying figures. In the figures, the left-most digit(s) of a reference number identifies the figure in which the reference number first appears. The same numbers are used throughout the drawings to refer various features of the present subject matter.

DETAILED DESCRIPTION

In an implementation, car parking assembly for reducing a gap between two parked cars is described. In one example, the car parking assembly may be implemented in a basement of a building and place where there is a space constraint. In the implementation the car parking assembly for reducing a gap between two parked cars comprises a rail mechanism, a plurality of V-bars, a parking platform, a pulling mechanism and a retraction ramp for reducing a gap between two parked cars.

In the implementation, the rail mechanism for facilitating horizontal movement of a car when parked further comprises a first rail, a second rail and a plurality of equally spaced connection bars. In the said implementation, the first rail and the second rail are arranged parallel to each other and each of the connection bars is perpendicular to the first rail and the second rail. Further, each of the connection bars is connected at one end to the first rail and at other end to the second rail.

In the implementation, the plurality of V-bars further comprises a first bar and a second bar for facilitating parking of a rear wheel and front wheel of the car, respectively. Furthermore, one end of the first bar and one end of the second bar are connected to form an obtuse angle. The first bar further comprises a ribbed pattern for restricting the movement of the rear wheel of the car. Furthermore, the ribbed pattern partially covers the top surface of the first bar. The second bar further comprises a locking mechanism, a pair of rollers and a pair of connecting rings. In the said implementation, the locking mechanism is coupled with one end of second bar, and configured to restrict movement of the front wheel of the car. In one example, upon unlocking the locking mechanism the car is adapted to move forward. Further in the said implementation, the pair of rollers are located on the bottom surface of the second bar and are adapted to move over rail mechanism, In the implementation, the parking platform is located on the V-bars mounted on the rail mechanism. The parking platform further comprises a first platform and a second platform. Further, the first platform comprises a U-cut section located substantially near an end of the first platform for receiving the locking mechanism. The first platform is connected to the second platform. Further, the inner surface of the second platform forms an obtuse angle with the inner surface of the first platform and an acute angle with the ground for mounting the car on the parking platform.

In the implementation, the pulling mechanism is connected with the plurality of V-bars for moving the V-bars along the rail mechanism when a car is parked. Further, the pulling mechanism is connected to the V-bars via a pair of connecting rings.

In the implementation, the retraction ramp comprises a first section and a second section. Further, the first section is parallel to the ground. Furthermore, one end of the first section is connected to the second rail and other end of the first section is connected to one end the second section. The second section is inclined to the ground, to facilitated unpacking of a car.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any assembly and methods similar or equivalent to those described herein can be used in the practice or testing of embodiments of the present disclosure, the exemplary, assembly and methods are now described. The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described, but is to be accorded the widest scope consistent with the principles and features described herein.

Figure 1A:
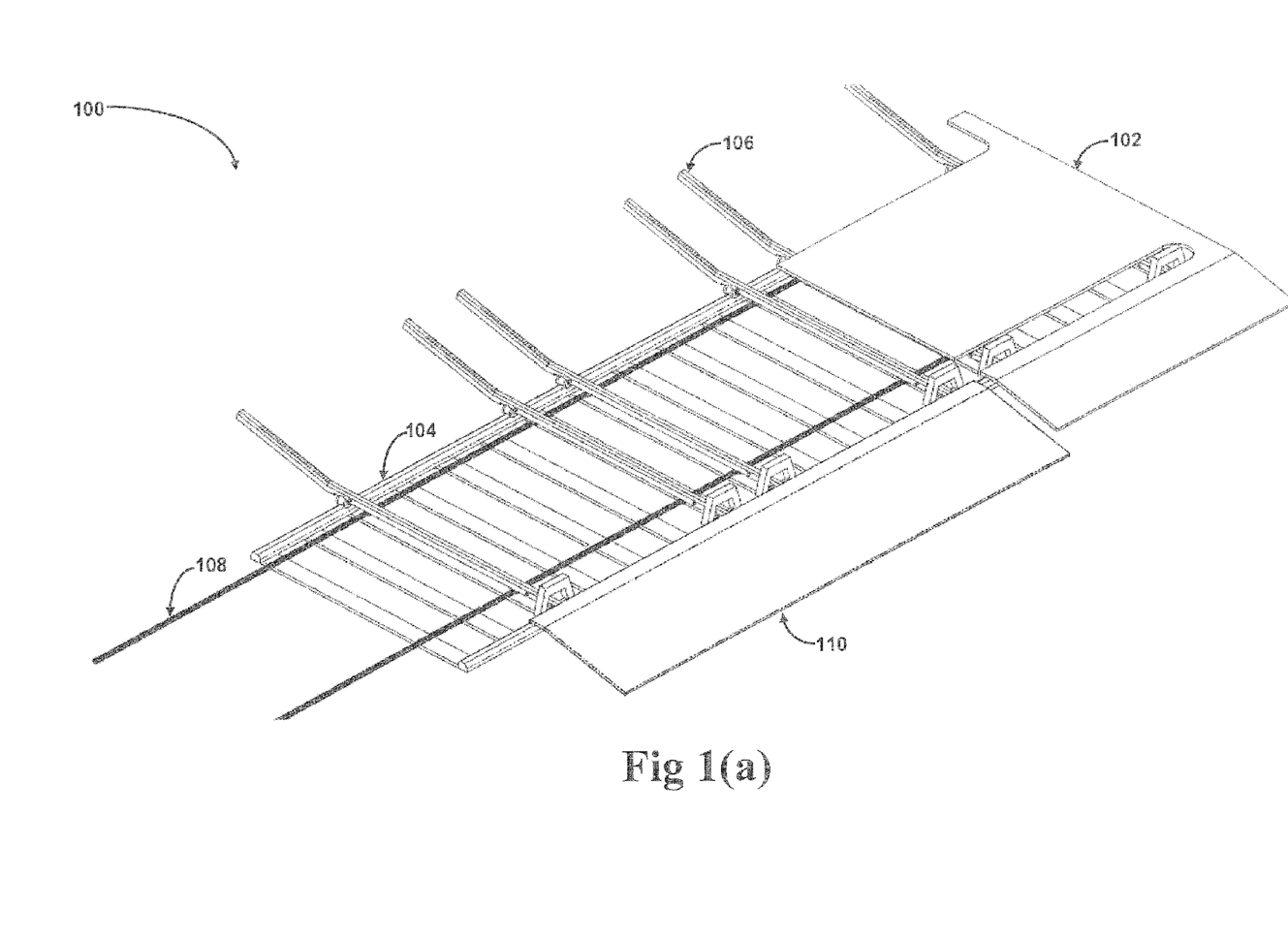
FIG. 1(a) illustrates an isometric view of a car parking assembly for reducing a gap between two parked cars, in accordance with an embodiment of the present subject matter
Figure 1B:
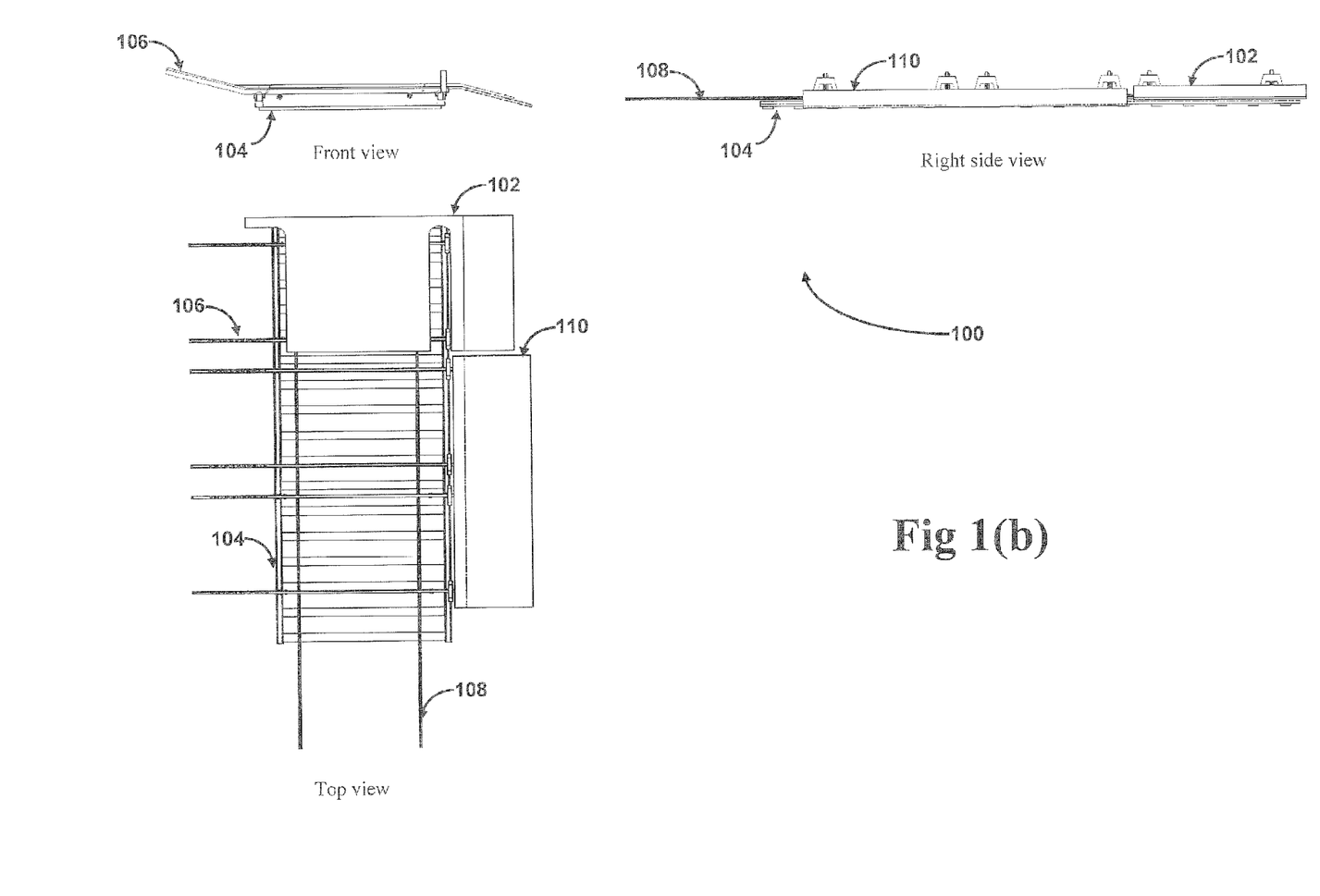
FIG. 1(b) illustrates a top view, a front view and a right side view of the car parking assembly in accordance with an embodiment of the present subject matter.

Referring now to FIG. 1(a) and FIG. 1(b), a car parking assembly 100 for reducing a gap between two parked cars, in accordance with an embodiment of the present subject matter is illustrated. In the implementation the car parking assembly 100 for reducing a gap between two parked cars comprises a rail mechanism 104, a plurality of V-bars 106, a parking platform 102, a pulling mechanism 108 and a retraction ramp 110.

In one example of the implementation of the car parking system 100, construe the system as shown in FIG. 1(a) and FIG. 1(b) implemented in a basement of a high rise building. In the example, the rail mechanism 104 is mounted on the ground in the basement, upon which the plurality of V-bars 106 is mounted such that V-bars 106 can move along the rails 104. Further, the parking platform 102 is mounted on top of the V-bar 106, fixedly connected with the rail mechanism 104. In this configuration, the V-bar 106 is free to move between the parking platform 102 and the rail mechanism 104. Further, the retraction ramp 110 is connected to the rail mechanism.

In the said example, construe a car A entering the basement for the high rise with the intention of parking. Upon entering the car is mounted rear wheel first i.e. in reverse on the parking platform 102 for parking, such that wheels of the car rest on the V-bar 106 placed below the parking platform 102. In the parked state on the V-bar 106, the car is inclined to the ground and the rear wheels of the car are locked by the ribbed pattern 504 and the font wheel of the car are locked by the locking mechanism 508. Subsequent to parking, the pulling mechanism 108 pulls the V-bar 106 and in turn the car A parked on the V-bar 106. Now construe car B entering the basement for the high rise with the intention of parking. In the example of car B the above described steps are repeated and the pulling mechanism 108 pulls the V-bar 106 and the car B parked on the V-bar 106 close to the previously parked car A. Thus reducing the gap between the cars and enabling increase of car parking space.

In the said example, construe a car A is to be un-parked. In the example, the locking mechanism 508 is unlocked. Due to the inclined nature on the parked car A, the car A roles forward in a controlled manner over the retraction ramp 110. Thus enabling easy access to the diver seat. Upon the un-parking of car A, the car B may be pulled to occupy the space of car A, thus making space for new car.

Rail Mechanism 104

Figure 2:
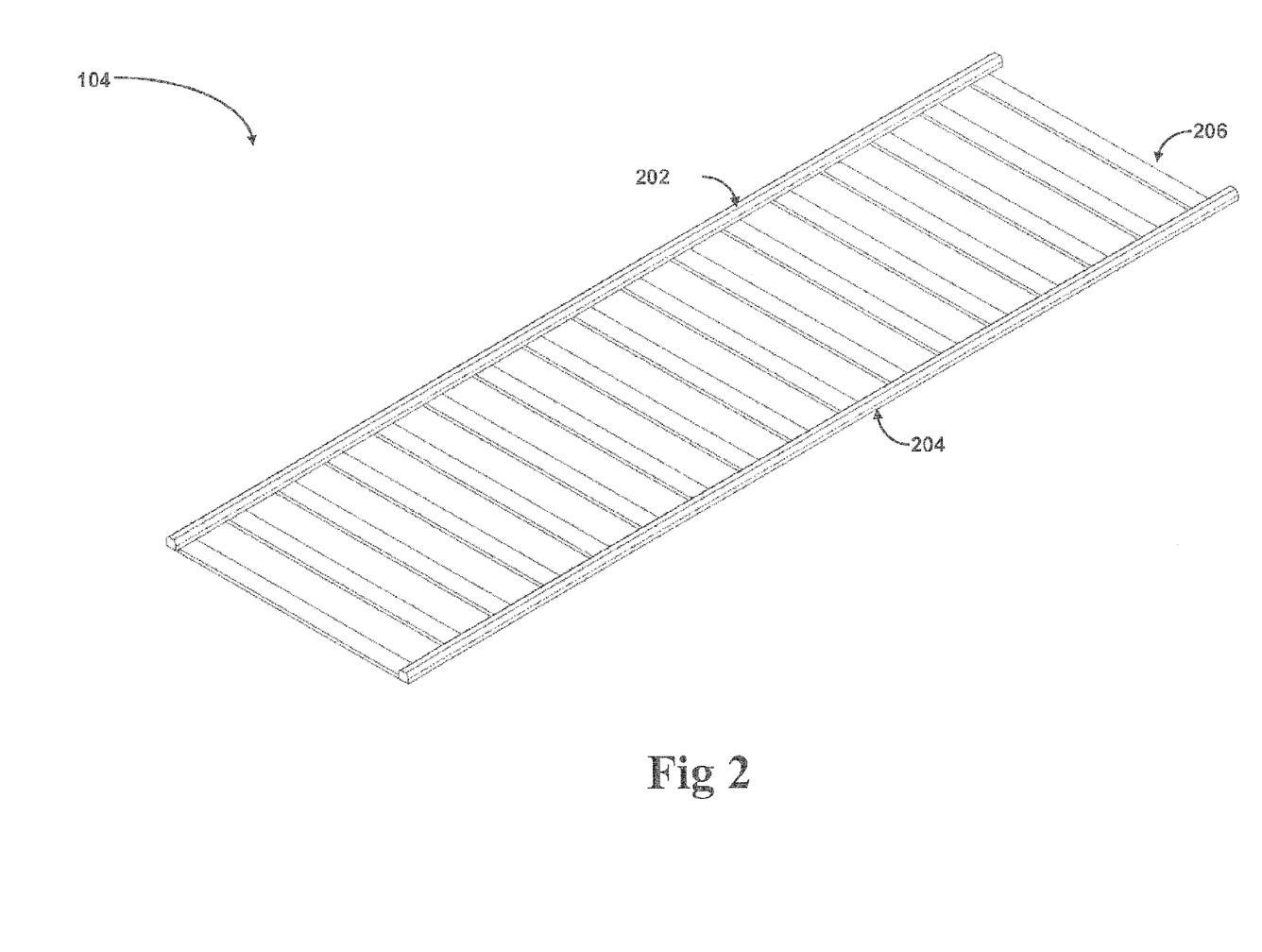
FIG. 2 illustrates an isometric view of a rail mechanism of the car parking assembly in accordance with an embodiment of the present subject matter.

Referring to FIG. 2, in the implementation, the rail mechanism 104 facilitates horizontal movement of a car when parked. Further the rail mechanism 104 comprises a first rail 202, a second rail 204 and a plurality of equally spaced connection bars 206. In the said implementation, the first rail 202 and the second rail 204 are arranged parallel to each other and perpendicular to each of the plurality of connection bars 206. Further, each of the plurality of connection bars 206 are connected at one end to the first rail 202 and at other end to the second rail 206.

V-Bar 106

Figure 5A:
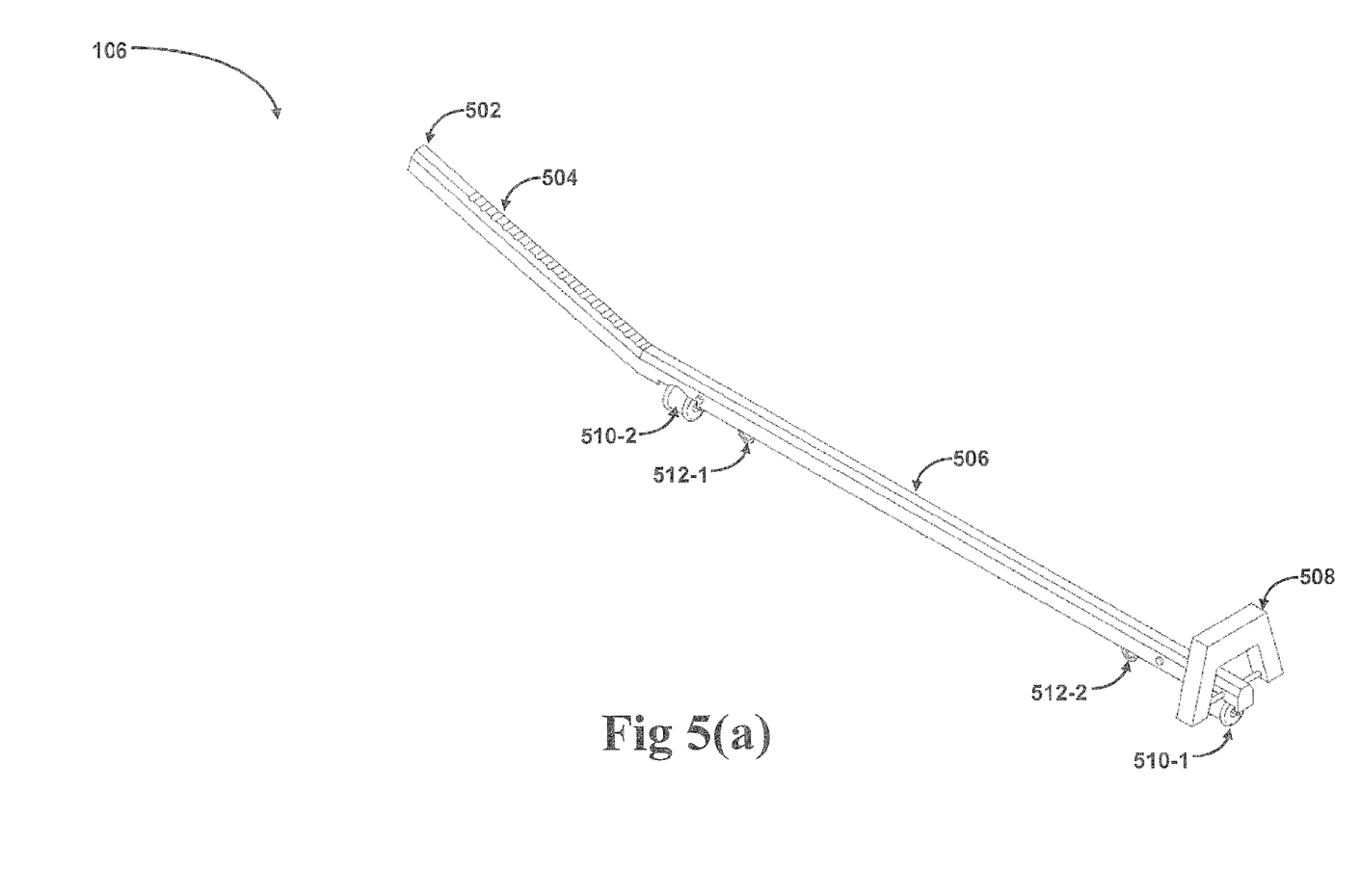
FIG. 5(a) illustrates an isometric view of a V-bar of the car parking assembly, in accordance with an embodiment of the present subject matter.
Figure 5B:
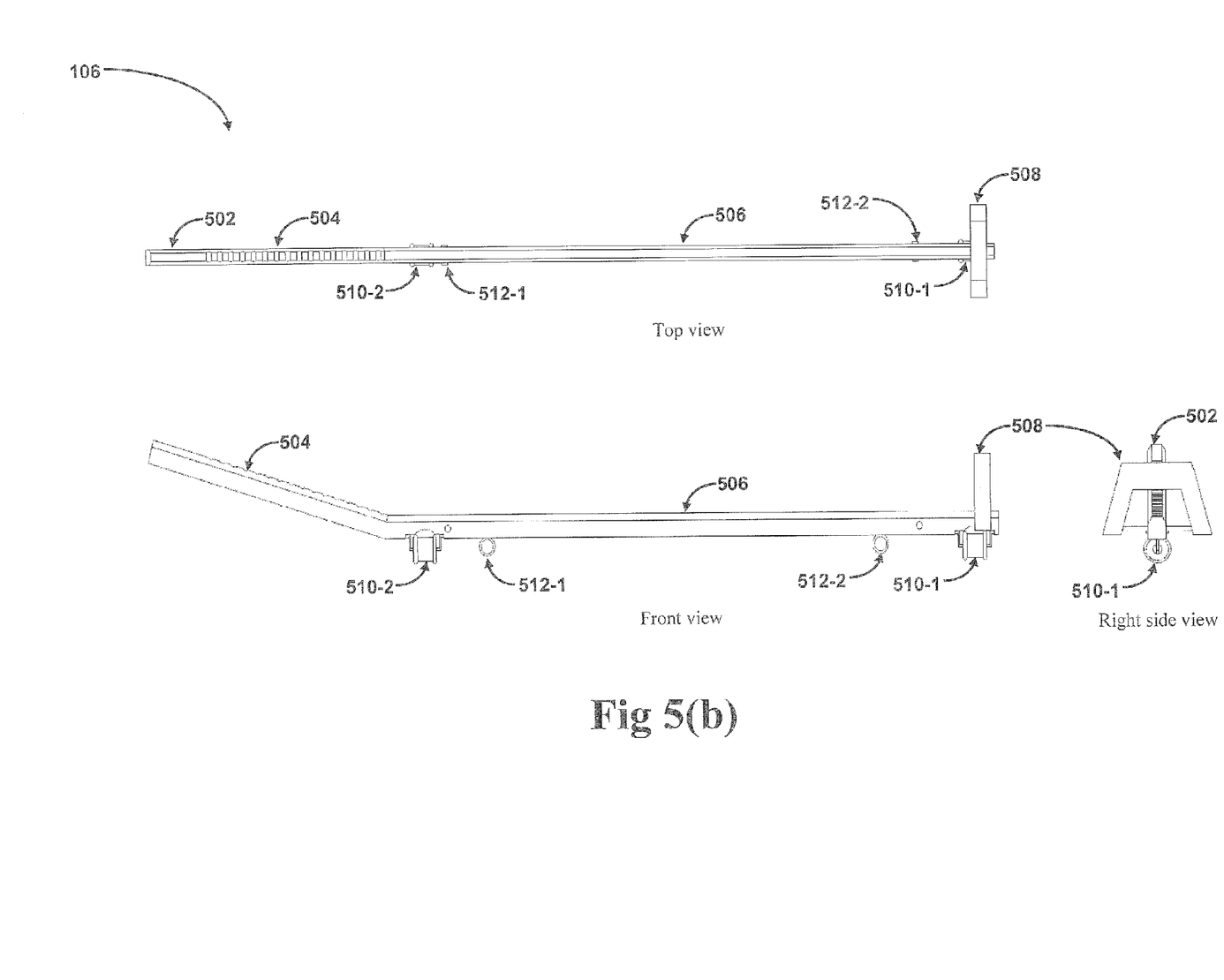
FIG. 5(b) illustrates, a top view, a front view and a right side view of a V-bar of the car parking assembly, in accordance with an embodiment of the present subject matter

Referring to FIG. 5(a) and FIG. 5(b), in an implementation, the plurality of V-bars 106 for facilitating the parking of a car further comprises a first bar 502 and a second bar 506 for facilitating parking of a rear wheel and a front wheel of the car, respectively. Furthermore, one end of the first bar 502 and one end of the second bar 506 are connected to form an obtuse angle. In other words, the one end of the first bar 502 and one end of the second bar 506 are connected to form a "V". The first bar 502 further comprises a ribbed pattern 504 for restricting the movement of the rear wheel of the car. Furthermore, the ribbed pattern 504 partially covers the top surface of the first bar. The second bar 506 further comprises a locking mechanism 508, a pair of rollers 510-1, 510-2 and a pair of connecting rings 512-1, 512-2. In the said implementation, the locking mechanism 508 is coupled with one end of second bar 506, and configured to restrict movement of the front wheel of the car. In one example, the locking mechanism may be any mechanism known in the art by which the forward moment of the front wheel as described may be restricted. In one example, upon unlocking the locking mechanism the car is adapted to move forward. Further in the said implementation, the pair of rollers 510-1, 510-2 and the pair of connecting rings 512-1, 512-2 is located on the bottom surface of the second bar. Further, the pair of rollers 510-1, 510-2 adapted to move over rail mechanism. In one example the shape of the rails is complementary to the shape of the roller such as the rollers may be movable coupled with the rails.

Parking Platform 102

Figure 3:
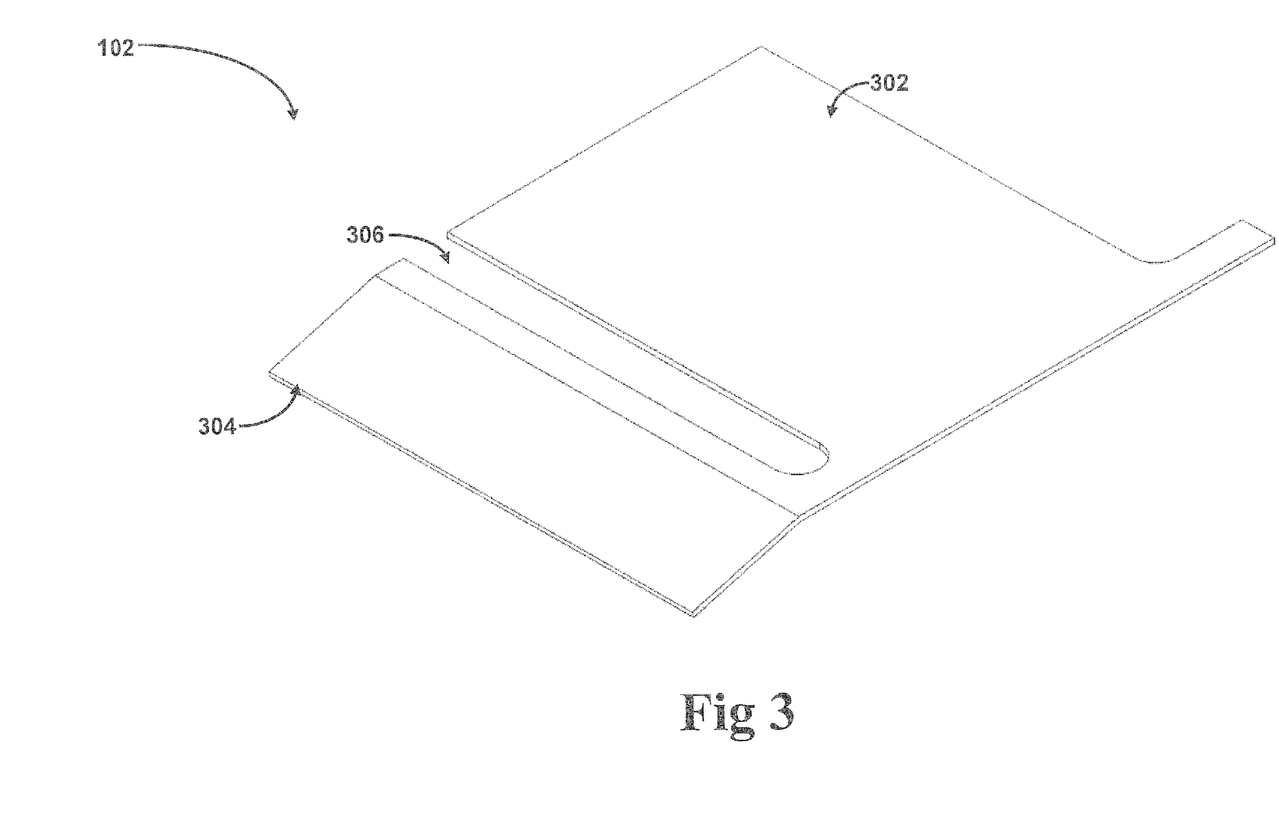
FIG. 3 illustrates an isometric view of a parking platform of the car parking assembly, in accordance with an embodiment of the present subject matter.

Referring to FIG. 3, in the implementation, the parking platform 102 is located on the V-bars 110 mounted on the rail mechanism 104. The parking platform 102 further comprises a first platform 302 and a second platform 304. Further, the first platform 302 comprises a U-cut section 306 located substantially near an end of the first platform 302 for receiving the locking mechanism 508. The first platform 302 is connected to the second platform 305. Further, the inner surface of the second platform 304 forms inclination with the ground for mounting the car on the parking platform 102. In one example, the parking platform facilitates the parking of the car. In the parked condition, the wheels of the car full rests on the V-bar placed below the parking platform

Retraction Ramp 110

Figure 4:
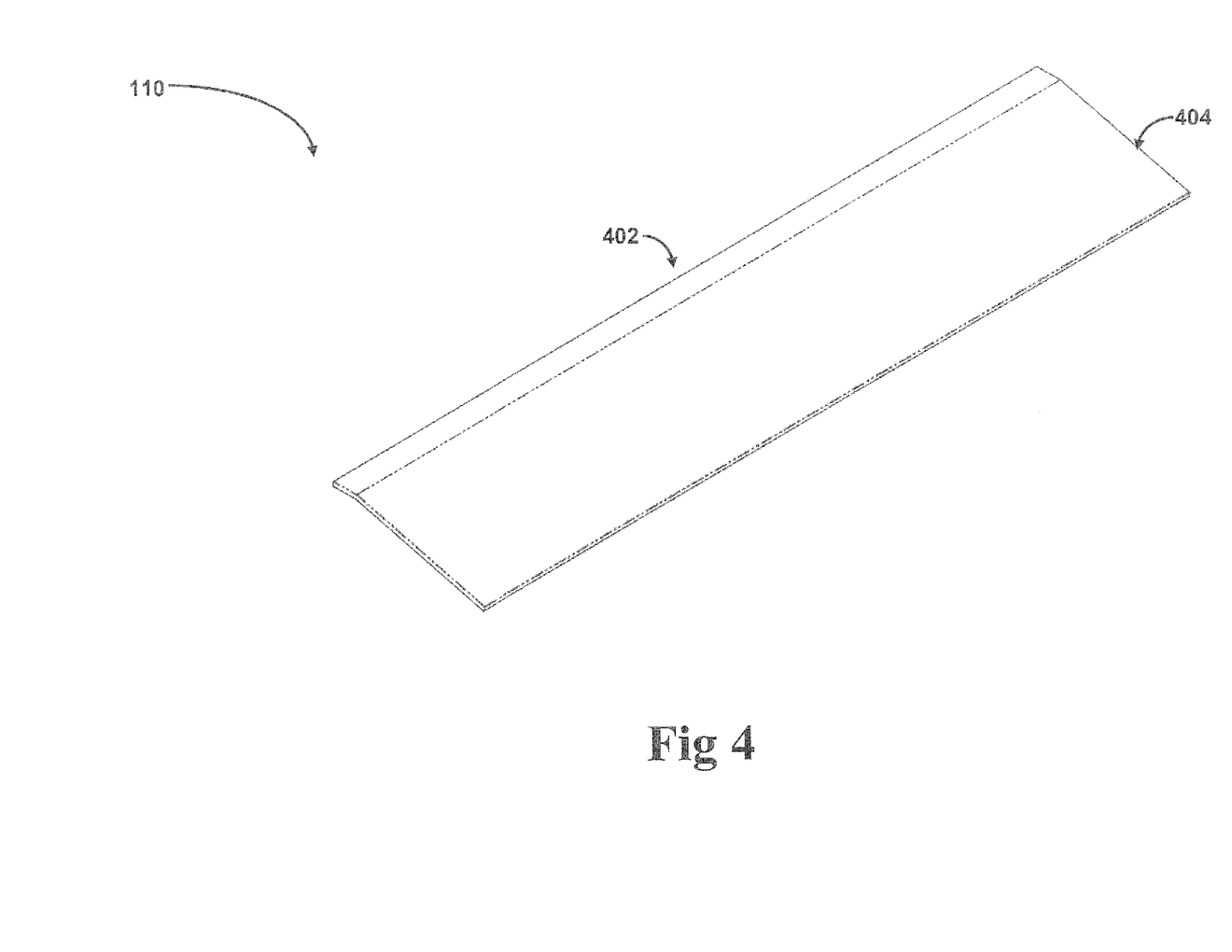
FIG. 4 illustrates an isometric view of a retraction ramp of the car parking assembly in accordance with an embodiment of the present subject matter.

Referring to FIG. 4, in an implementation, the retraction ramp 110 comprises a first section 402 and a second section 404. Further, the first section 402 is parallel to the ground. Furthermore, one end of the first section 402 is connected to the second rail 204 and other end of the first section 402 is connected to one end the second section 404. The second section 404 is inclined to the ground, to facilitate un-parking of the car.

Pulling Mechanism 108

In the implementation, the pulling mechanism 108 is connected with the plurality of V-bars 106 for moving the car mounted on the V-bars 106 along the rail mechanism 104 when a car is parked. Further, the pulling mechanism 108 is connected to the V-bars 106 via the pair of connecting rings 512-1, 512-2. In an example, the pulling mechanism 108 may comprise steel wires connected to V-bars 106 via a pair of connecting rings 512-1, 512-2 at one end and a high power motor (not shown) or hydraulic system (not shown) at other end. Once the car is parked on the V-bar 106, high power motor may move the car to the first available space thus reducing the gap between the cars and forming a stack.

Exemplary embodiments discussed above may provide certain advantages. Though not required to practice aspects of the disclosure, these advantages may include those provided by the following features.

Some embodiments of the car parking assembly enable reduction of space between two parked cars.

Some embodiments of the car parking assembly provide flexibility to park more cars in limited space.

Some embodiments of the car parking assembly enable stack formation of cars which may be used to check the timings and according manage the parking charges.

Some embodiments of the car parking assembly un-parking of the cars without switching on the engine thus saving fuel.

Although implementations of car parking assembly for reducing a gap between two parked cars have been described in language specific to structural features and/or methods, it is to be understood that the appended claims are not necessarily limited to the specific features or methods described. Rather, the specific features are disclosed as examples car parking assembly for reducing a gap between two parked cars.

We claim:

1. A car parking assembly (100) for reducing a gap between two parked cars, the car parking assembly (100) comprising:
   a rail mechanism (104) to facilitate horizontal movement of a car when parked, wherein the rail mechanism (104) further comprising:
      a first rail (202) and a second rail (204) arranged parallel to each other; and
      a plurality of equally spaced connection bars, wherein each connection bar is connected at one end to the first rail (202) and at other end to the second rail (204), and wherein each connection bar (206) is perpendicular to the first rail (202) and the second rail (204); and
   a plurality of V-bars (106) mounted on the rail mechanism (104) to facilitate the parking of a car, wherein each of the plurality of V-bars are independent of each other and independently movable along the first rail (202) and the second rail (204), wherein the car is parked on two of the plurality of V-bars (106), wherein each of the V-bar (106) further comprises:
      a first bar (502) for facilitating parking of a rear wheel of the car, wherein the first bar (502) comprises a ribbed pattern (504) for restricting the movement of the rear wheel of the car, wherein the ribbed pattern (504) partially covers the top surface of the first bar;
      a second bar (506) for facilitating parking of a front wheel of the car, the second bar (506) further comprising
         a locking mechanism (508) coupled with one end of second bar (506), and wherein the locking mechanism (508) is configured to restrict movement of the front wheel of the car and wherein upon unlocking the locking mechanism the car is adapted to move forward; and a pair of rollers (510-1, 510-2) displaced on the bottom surface of the second bar (506), wherein the pair of rollers (510-1, 510-2) are adapted to move over the first rail (202) and the second rail (204); and wherein one end of the first bar (502) and one end of the second bar (506) are connected to form the V-bar (106), wherein the V-bar (106) is a rigid, single structure having a static obtuse angle formed between the first bar (502) and the second bar (506).

2. The car parking assembly (100) of claim 1 further comprising a parking platform (102) to facilitate the parking of the car, the parking platform (102) further comprising:

a first platform (302) comprising a U-cut section (306) displaced substantially near one end of the first platform (302) for receiving the locking mechanism; and a second platform (304) having an end connected to the first platform (302), and wherein the second platform (304) is inclined with the ground for mounting the car on the parking platform (102).

3. The car parking assembly (100) of claim 1 further comprising a pulling mechanism (108) connected with the V-bars for moving the V-bars along the rail mechanism (104) when a car is parked, wherein the pulling mechanism (108) is connected to the V-bars via a pair of connecting rings (512-1, 512-2).

4. The car parking assembly (100) of claim 1 further comprising a retraction ramp (110) for un-parking the car, the retraction ramp (110) further comprising a first section (402), wherein the first section (402) is parallel to the ground, wherein one end of the first section (402) is connected to the second rail (204); and a a second section (404), wherein one end a second section (404) is connected to other end of the first section (402), and wherein the second section (404) is inclined to the ground.

\* \* \* \* \*